Nov. 2, 1965 H. B. ISAACSON 3,215,958

ADJUSTABLE MICROWAVE ATTENUATOR HAVING BROAD-BAND FREQUENCY COMPENSATION

Filed July 20, 1961 2 Sheets-Sheet 1

INVENTOR.
HAROLD B. ISAACSON

INVENTOR.
HAROLD B. ISAACSON 3,215,958
Patented Nov. 2, 1965

3,215,958

ADJUSTABLE MICROWAVE ATTENUATOR HAVING BROAD-BAND FREQUENCY COMPENSATION

Harold B. Isaacson, 1 Neil Drive, Old Bethpage, N.Y.
Filed July 20, 1961, Ser. No. 125,410
6 Claims. (Cl. 333—81)

This invention relates to radio frequency attenuators and more particularly to TEM mode attenuators which are relatively frequency insensitive over a broad band of frequencies.

Prior art attenuators have suffered from the fact that they are relatively frequency sensitive within the band of frequencies over which they are designed to operate. As a result, the values of attenuation versus frequency do not have a desired flatness over the operating band width. This problem of frequency sensitivity becomes particularly acute when attenuators which are intended to introduce variable amounts of attenuation into a microwave circuit are utilized. Very often, to obtain a relatively flat attenuator, band width must be sacrificed and, in other instances, specifications which are required to be reproducible are practically impossible to meet.

It is therefore an object of this invention to provide a radio frequency attenuator which is relatively frequency insensitive.

Another object is to provide a variable attenuator which has a relatively flat attenuation versus frequency characteristic over a wide frequency range.

A further object is to provide a variable attenuator whose attenuation versus frequency characteristic is substantially reproducible over wide ranges of resistivity of the attenuating material.

A still further object is to provide a variable attenuator having an attenuating material disposed therein the slope of whose attenuation versus frequency characteristic may be varied at will.

A feature of this invention is the utilization of a transmission line which propagates radio frequency energy in a TEM mode in conjunction with an attenuating septum which has an attenuation versus frequency characteristic whose derivative varies with frequency. Also utilized is a conductive compensating means coupled to said attenuating means to adjust the aforementioned characteristic such that its derivative is changed from its initial values over a relatively broad band of frequencies.

Another feature of this invention is the utilization of a conductive septum coupled in coacting relationship with at least a portion of an attenuating septum.

A still further feature of this invention is the utilization of a septum having first and second portions, the first of which is an attenuating substance, the second being a conductive compensating material. This septum, when introduced into the electric field of a strip type transmission line provides for continuously variable values of attenuation and further provides, for any given setting, a value of attenuation which is substantially constant over a relatively wide range of frequencies.

The above mentioned and other features and objects of this invention and the manner of attaining them will become more apparent by reference to the following description taken in conjunction with the accompanying drawings, wherein.

Figure 5:
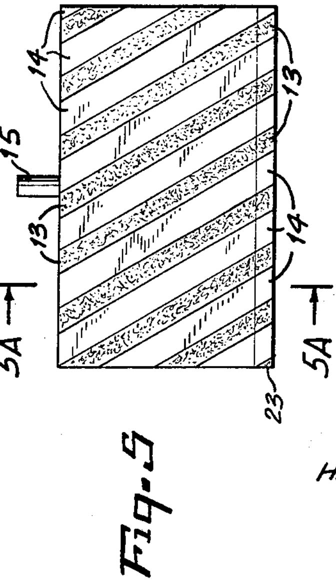
FIG. 5 is a plan view of an attenuating and compensating means which may be substituted for like means as shown in FIG. 1.
Figure 5A:
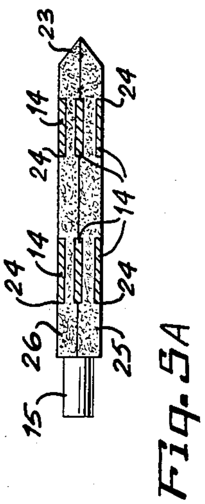

FIG. 5*a* is a cross-sectional view of FIG. 5 taken along lines 5—5.

Figure 6:
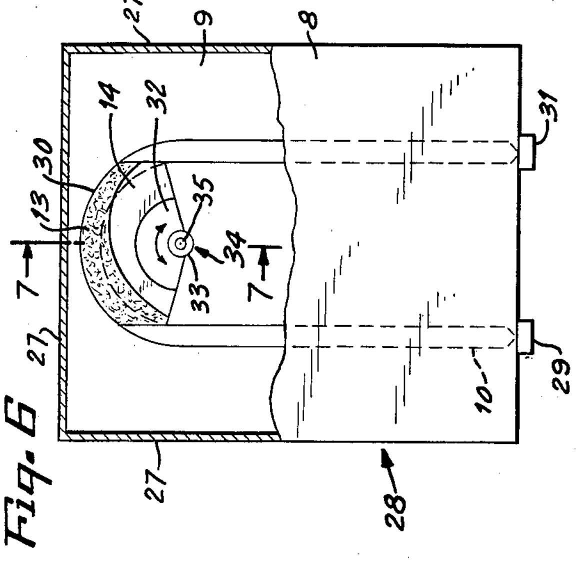

FIG. 6 is a partially cut-away plan view of a variable attenuator having independently rotatable attenuating and conductive compensating septums in accordance with the teaching of this invention.

Figure 7:
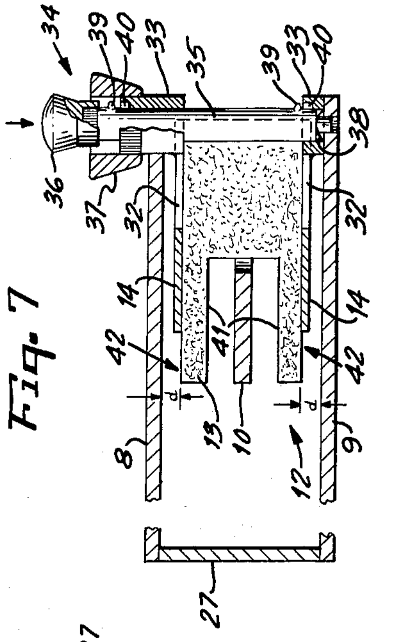

FIG. 7 is a cross-sectional view of FIG. 6 taken along line 7—7.

Figure 9:
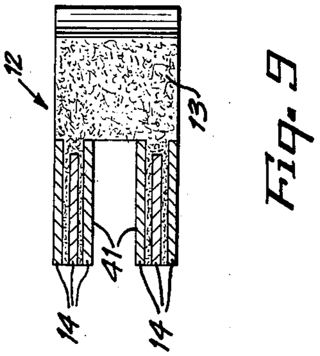
Figure 8:
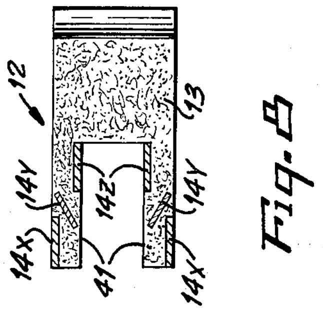

FIGS. 8 and 9 are alternative embodiments of rotatable variable attenuator having attenuating and conductive septums which are simultaneously rotatable and may be substituted in the embodiment of FIG. 6.

Figure 1:
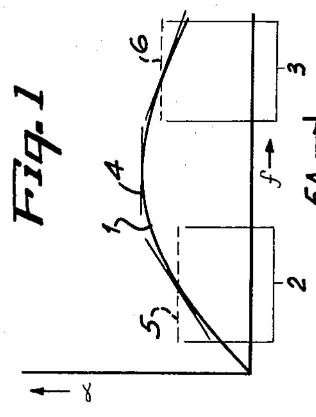
FIG. 1 is a curve of attenuation versus frequency whose derivative varies with frequency.
Figure 4:
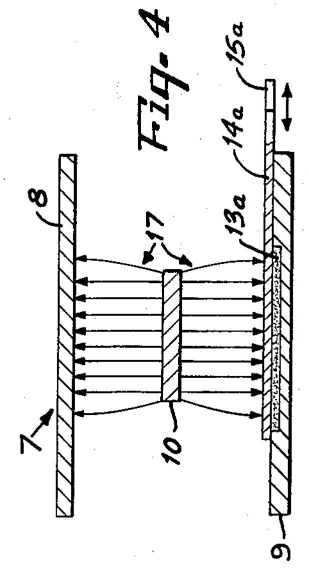
FIG. 4 is a cross-sectional view of a balanced strip transmission line showing the normal electric field distribution and, in addition, shows an attenuating means inlaid in a ground plane thereof and a conductive compensating septum which is movable disposed in a position of zero attenuation.

Referring now to FIG. 1, there is shown at 1 a curve of attenuation versus frequency for an attenuating material consisting of iron particles distributed in a dielectric material. In this connection, reference is made to "Wheeler Monographs," vol. I, Numbers 1–11, 1948–49, published by Wheeler Laboratories, 1953. Specifically, this reference in Monograph 6 on page 14, FIG. 4, shows a curve of loss tangent versus frequency for an attenuating material consisting of iron particles disposed in a dielectric material. The associated text explains the reasons for the variation of loss-tangent with frequency but, because these reasons are generally well known to those skilled in the art, they need not be elaborated on for purposes of this disclosure. Since loss tangent is proportional to attenuation, the latter parameter has been indicated in FIG. 1 for purposes of clarity and to indicate the general result produced by the structures of this invention.

In FIG. 1, region 2 of curve 1 is a region wherein the derivative of the frequency versus attenuation characteristic is positive. Thus, the slope of the curves within region 2 has a positive value. Region 3 is a region where the derivative of the attenuation versus frequency characteristic is negative and the slope of the curve within region 3 has a negative value. At region 4, the slope is substantially zero. From the foregoing it may be seen that attenuating materials consisting of iron particles disposed in a dielectric, in general, have derivatives which vary with frequency, that is: for one frequency range the derivative may be positive; for another range the derivative may be negative and for yet another frequency range the derivative may be zero. In general then, it may be stated that attenuators of the type mentioned hereinabove exhibit frequency sensitivity, a characteristic which is deleterious when it is desired to provide a value of attenuation which is constant over a relatively broad range of frequencies.

Applicant has discovered, in his efforts to achieve an attenuation versus frequency characteristic which is flat over a relatively broad band of frequencies, that a conductive compensating means coacting with the attenuating material may be utilized to vary the derivative of the frequency versus attenuation characteristic from its initial values to values which are different therefrom. Thus, by means to be described hereinbelow, applicant is able to tailor the derivative over a wide frequency range. Thus, in FIG. 1, the attenuation versus frequency characteristic of region 2 may be tailored to provide a derivative which is substantially zero, as shown by the dotted portion 5. Dotted portion 6 in FIG. 1 shows how the characteristic 1 may be tailored to provide in region 3 a characteristic whose derivative is substantially zero. In region 5 where the derivative is substantially zero, the characteristic may be changed to provide a derivative which is positive or negative indicating that attenuating materials which have a relatively constant attenuation over a frequency range may be tailored to provide values of attenuation which increase or decrease rapidly over the frequency range. This latter effect, while it provides a useful result, is not of immeditae interest in that it is usually desired to obtain a flat attenuation over a frequency range rather than increasing or decreasing values of attenuation.

The overall effect of introducing a conductive compensating means to coact with the attenuating material in a radio frequency field is, in a region of positive slopes, region 2 in FIG. 1, is to slightly reduce the value of attenuation at the high frequency end of the region and substantially increase the values of attenuation at the low frequency end of the region so that the values of attenuation over the whole region are substantially constant. A similar effect takes place in region 3 having negative slopes except that the attenuation is substantially increased at the high frequency end of the region and slightly reduced at the low frequency end thereof. Both fixed and variable attenuators may be constructed utilizing the teaching of this invention as may be seen from a consideration of the following descriptions.

Figure 2:
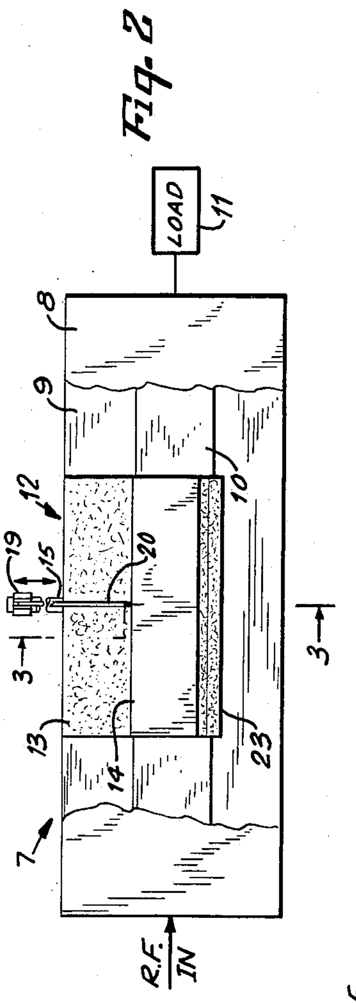
FIG. 2 is a partially cut-away plan view of a section of TEM mode strip transmission line having attenuating and compensating means according to this invention disposed therein.

In FIG. 2, there is shown at 7 a partially cut-away plan view of a section of TEM mode strip transmission line having upper and lower ground plane elements 8, 9, respectively, and, a strip conductor element 10 disposed therebetween; all of said elements being disposed in parallel relationship with each other. Radio frequency energy may be coupled to section 7 as indicated in FIG. 2 by any means well known to those skilled in art. The radio frequency energy propagates through section 7 and may be delivered to a load 11, such as an antenna, either substantially unchanged in power or substantially reduced in power depending on the position of a septum shown generally at 12 with respect to the electric field of the radio frequency energy being propagated. Septum 12 has first and second portions 13, 14 respectively and, in FIG. 2, is shown at a position of maximum attenuation. Handle 15, in FIG. 2, is a means for positioning septum 12 within section 7 and may consist of any well known means for translating, such as a micrometer lead screw arrangement, to vary the position of septum 12 from positions of maximum attenuation, as shown, or to a position of substantially zero insertion loss.

Figure 3:
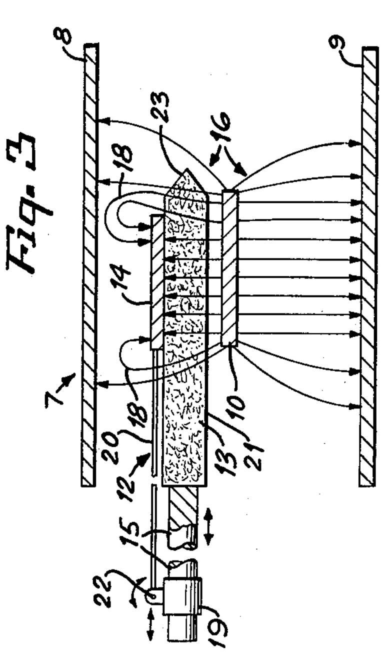
FIG. 3 is a cross-sectional view of FIG. 2 taken along line 3—3 showing the electric field distribution in an attenuator according to this invention.

FIG. 3 shows a cross-sectional view taken along lines 3—3 of FIG. 2 and clearly indicates the position of septum 12 with respect to elements 8, 9 and 10 of transmission line section 7. Septum 12 is disposed in a plane substantially parallel to the planes of elements 8, 9, and 10 and, in the position of maximum attenuation, it extends over and substantially covers strip element 10. First portion 13 is an attenuating means or septum which has an active portion substantially equal to the width of strip 10 and its length is at least a portion of a wave length at the mean operating frequency of the frequency range in which it is being utilized. Attenuators having a length equal to one-tenth of a wavelength have been successfully constructed. First portion 13, which acts as an absorber of incident radio frequency energy may consist of metallic particles disposed in a dielectric substance. One example of such a material is "Polyiron," which may be purchased commercially under that trade name. Any similar substance, however, may be utilized without departing from the teaching of this invention. It has been noted, in connection with the resistivities obtained after the Polyiron has been processed into the form of portion 13, that the values of resistivity from one such portion to the next may vary over a wide range. Formerly, these variations gave rise to great problems when it was necessary to produce a large quantity of attenuators having the same values and range of attenuation, but now, if the teaching of this invention is utilized, resistivities may vary between 10 ohm/cm. and 100,000 ohm/cm. and attenuators having substantially equal values and ranges of attenuation may be produced without difficulty. In addition, the frequency sensitivity normally experienced is compensated for to such an extent that for any given setting of the septum 12 the attenuation is substantially constant over a wide range of frequencies.

The foregoing useful effects are produced by second portion 14 of septum 12, which portion 14 is a conductive compensating means or conductive septum disposed in coacting relationship with attenuation means or septum 13, as shown in FIGS. 2 and 3. Attenuating means 13 and conductive compensating means 14 are adapted to interact with the radio frequency energy being propagated through transmission line section 7. In FIG. 3, the electric field distribution in an attenuator, according to this invention, is shown generally at 16. In the type of transmission line shown in FIG. 3, the electric field reverses every half wavelength and the field lines alternately terminate on ground plane elements 8, 9 and on strip element 10. Normally, the field extends perpendicularly between strip element 10 and ground plane elements 8, 9 except for the extremities of the strip element 10 where the field fringes. The normal field distribution is shown at 17 in FIG. 4. When septum 12 is introduced, however, the field pattern is changed in such a way that, while the electric field lines remain perpendicular in the region between strip element 10 and conductive compensating septum 14, the remaining field lines are warped and the field pattern produced is as shown at 18 in FIG. 3. It is this warping of the electric field which is believed to be responsible for producing a flat frequency response over a relatively wide frequency range, where prior to the utilization of conductive compensating septum 14, the response was extremely frequency sensitive.

Conductive compensating septum 14 in FIGS. 2 and 3 is a rectangular conductive strip disposed in parallel relationship with elements 8, 9, 10 and in overlying relationship with a portion of attenuating septum 13. This juxtaposition of septums 13, 14 is only one of many arrangements which may utilized to obtain a flat frequency response over a wide range of frequencies as will be explained hereinafter.

In the embodiment of FIGS. 2 and 3, the compensating septum 14 may be a foil of a non-ferrous metal such as aluminum or a metallic paint, or an evaporated metallic film, or it may be a dielectric tape loaded with finely divided aluminum particles. In the latter arrangement, the particles are insulated one from the other by the dielectric material but, to radio frequency energy, the tape is highly conductive. Such a tape may be coated with an adhesive on one surface thereof to fix its position when the desired flat attenuation versus frequency characteristic has been attained by adjusting the position and amount of tape on the surface of attenuating septum 13. Tests have indicated that conductive septums of any size and shape which do not completely cover the active area of the attenuating septum (i.e., that area in which interaction between the maximum electric field and the attenuating material takes place) will provide a variation in the slope of the attenuation versus frequency characteristic as shown in FIG 1. A conductive septum which completely covers the active area of the attenuator is the limiting condition and merely appears to the radio frequency energy as a new ground plane resulting in high VSWR's and an attenuation characteristic which is still frequency sensitive.

In attempting to achieve a flat frequency response, compensating septum 14 may be gradually translated with respect to attenuating septum 13 by sliding collar 19 along handle 15. The motion of the collar is transmitted to septum 14 by arm 20 which may be made of some dielectric material such as Teflon. In addition to translating septum 14, the angle of septum 14 with respect to the planes of the strip and ground plane elements may be adjusted by rotating arm 20 about pivot 22 as indicated in FIG. 3. Septum 14, once a flat response has been achieved, may be positioned at an angle with respect to the transmission line elements by means of a Teflon support for instance, without seriously disturbing the VSWR.

Since the initial derivative of the attenuation versus frequency characteristic is known from measurements, further measurements indicate the trend of the derivative toward zero and the position of septum 14 may be adjusted for maximum flatness. Once this position has been attained, portions of septum 14 may be added or removed to achieve the flattest response possible over a wide range of frequencies. When a flat response has been achieved, a septum 14 which may be translated or rotated provides the added advantage of being able to introduce different amounts of attenuation at different frequencies.

Substantially the same effects as described hereinabove may be obtained by positioning a conductive compensating septum 14 on surface 21 of septum 13. Likewise, the conductive septum 14 may be inlaid in septum 13 or be sandwiched between laminations as indicated in FIGS. 5 and *5a*. Attenuating septum is provided with a taper 23 to provide a good impedance match as it is positioned within electric field 16. In FIGS. 2 and 3, and in the remaining figures, it should be understood that certain dimensions have been exaggerated to clearly show the teachings of this invention. Conductive septum 14 for instance, need only be of sufficient thickness to provide an element which is a conductor at radio frequencies.

Referring now to the cross-sectional drawing in FIG. 4, the normal electric field pattern 17, previously referred to, is shown extending from strip element 10, and terminating on one hand, on upper ground plane 8 and, on the other hand, on a movable conductive compensating septum 14*a*. Conductive septum 14*a*, in FIG. 4, is shown extending over an attenuating septum 13*a* which has been inlaid on the surface of ground plane element 9. In the position shown, the radio frequency field "sees" only a balanced strip transmission line since septum 14*a* shields septum 13*a* from any interaction with the electric field 17. As septum 14*a* is translated by handle 15*a*, electric field 17 interacts with attenuating septum 13*a* and increasing values of attenuation are introduced. Using the foregoing technique, a substantially flat frequency response has been obtained over a frequency range of 4 kmc. to 11 kmc.

Referring now to FIGS. 5 and *5a*, there is shown a septum 12*b* which may be substituted for septum 12 of FIGS. 2 and 3. Thus, in FIGS. 5, *5a*, a plurality of conductive compensating septums 14 are shown both inlaid in indentations 24 on a surface of attenuating septum 13 and also laminated between layers 25 and 26 which make up attenuating septum 13. As previously mentioned, the conductive septums 14 may consist of conductive tape, metallic foil, conductive paint or evaporated metallic films. All of these arrangements permit the removal or addition of conducting material to tailor the frequency response of the attenuator to a desired flatness.

Referring now to FIGS. 6 and 7, there is shown a partially cut-away plan view and a cross-sectional view taken along lines 7—7 in FIG. 6 of a preferred embodiment of this invention. In FIGS. 6 and 7, ground planes 8, 9 are shown as flat rectangular plates joined together by member 27 around the perimeter thereof forming a box-like structure 28 and having strip element 10 disposed midway between and in parallel relation to planes 8, 9. Ground planes 8, 9 may have any other shape, circular, for instance, without departing from the teaching of this invention.

In FIG. 6, radio frequency energy is coupled to strip element 10 by means of a coaxial connector 29 disposed in element 27. The radio frequency energy then propagates along the transmisison line formed by elements 8, 9 and 10; passes through arcuate interaction region 30 and exits from structure 28 by means of connector 31 either attenuated or unattenuated depending upon the position of septum 12 with respect to arcuate interaction region 30. Septum 12, in FIG. 6 is comprised of attenuating means or septum 13 and conductive compensating means or septum 14, both septums having an arcuate perimeter to allow for interaction with radio frequency energy in arcuate region 30. Portion 32 is a section of dielectric material coupled between outer barrel 33 of shaft 34 and conductive septum 14 which positions and permits rotation of septum 14. In FIGS. 6 and 7 septum 12 is in a position of maximum insertion loss.

Referring now to FIG. 7, it may be seen that attenuating septum 13 and conductive compensating septums 14 are simultaneously rotatable by means of shaft 34 which has outer barrel portions 33 and inner barrel 35. Knob 36, in the position shown in FIG. 7, rotates attenuating septum 13 independently of conductive septums 14. By depressing knob 36 against leaf spring 38, raised portions 39 on barrel 35 engage notches 40 disposed internally of outer barrel 33 and permit simultaneous rotation of septums 13 and 14 to permit the introduction of variable amounts of attenuation, which at any given setting are relatively constant over a wide range of frequencies. Attenuating septums 13 is made independently variable because it is thereby possible to take advantage of the attenuation versus frequency characteristic in the uncompensated condition.

FIG. 7 shows attenuating septum 13 having an edge thereof indented to form bifurcations 41 which are spaced from and extend over both surfaces of strip element 10. It should be noted that a spacing *d* is provided between the upper and lower ground planes and the adjacent surfaces 42 of septum 12. In FIG. 7, the space is an air dielectric but it may consist of any substantially dielectric material such as septums 13 in FIG. 5. The spacing *d* is important in the practice of this invention in that it permits the electric field lines to warp, as shown in FIG. 3, and terminate on the conductive compensating septum rather than on the ground plane elements 8, 9. The bifurcation of attenuation septum 13 permits the introduction of greater amounts of attenuation without increasing the length of the septum above a minimum, because the interaction is a volumetric phenomenon rather than being a function of surface area exposed for interaction. It is not necessary that the attenuating septum be bifurcated as the same result could be obtained by inserting two septums of the type shown in FIG. 3 adjacent strip element 10.

A variable attenuator similar to the attenuator described in connection with FIGS. 6 and 7, has been constructed and was designed to provide values of attenuation which varied between 0 and 50 db insertion loss over an octave band width of 2 to 4 kmc. The spread in values of attenuation, for a given setting and prior to the utilization of the conductive compensating septums, was 10 db between the high and low frequency ends of the band. This spread was reduced to a $\pm 1$ db spread over the band of frequencies and the VSWR obtained was less than 1.5 to 1. From the foregoing it may be seen that the derivative of the attenuation versus frequency characteristic was changed from values of relatively high slope to a value of substantially zero slope over the band. In FIG. 6, the shape of conductive septum 14 should be observed. The shape shown provided the desired flatness and was obtained on the basis of measurement and cut-and-try shaping of septums 14.

Referring now to FIGS. 8 and 9, there are shown septums 12 which may be substituted for the septum 12 of FIGS. 6, 7. Thus, in FIG. 8; septum 12 is made up of a bifurcated attenuating septum 13 and a plurality of conductive compensating septums 14*x*, 14*y*, 14*z* disposed internally and externally of septum 13. Compensating septums 14*x*, 14*y*, 14*z* are shown disposed in a staggered fashion with respect to the edge of bifurcations 41 to provide a good impedance match when the septum is inserted into the radio frequency field. Septums 14 may be disposed parallel to the planes of the transmission line elements 8, 9, 10 as are septums 14*x* and 14*z* or may be inclined at an angle with respect to these elements as are septums 14*z* without affecting the degree of flatness obtainable.

Referring to FIG. 9, there is shown an attenuating septum 13 having bifurcations 41 on one edge thereof. In this embodiment, conductive septums 14 may consist of areas of attenuating material of different resistivity from the resistivity of the material which comprises attenuating septum 13. The resistivity of septums 14 may be higher or lower than that of the attenuating material and it is still possible to obtain a flat attenuating characteristic over the band of frequencies being utilized. The septums 14, in FIG. 9, may be disposed in the same manner as described in connection with the conductive septums of FIG. 8.

Conductive septums 14 in FIGS. 8 and 9 may have plan-view shapes similar to that shown in FIG. 6. The cross-sectional positioning of septums 14, however, is limited only by the fact that there must be a dielectric gap between septums 14 and the surface upon which electric field lines would ordinarily terminate if no conductive septum were present. Once the septums 14 are positioned to provide a warping effect on the electric field distribution, a variety of shapes of septum 14 will provide a compensating effect and, by cut-and-try shaping, the desired flatness is obtainable. Once a positioning and shaping of septums 14 have taken place, all other conditions being the same, the attenuation versus frequency characteristic is reproducible. If, however, the resistivity of attenuating septums 13 changes from one to another, the shape of septums 14 will be different, but as a result of cut-and-try shaping, the attenuation versus frequency characteristic having the desired flatness is still reproducible.

It should be noted, in connection with TEM mode transmission lines, that the techniques described hereinabove may be utilized in both coaxial line and in single wire-over-ground plane environments and the attenuation versus frequency characteristic will be substantially flattened. As in the structures shown, the septums must be introduced perpendicular to the electric field and a dielectric space must be provided between the ground plane and the conductive septum to permit warping of the electric field.

While the principles of the invention have been described in connection with specific apparatus, it is to be clearly understood that this description is made only by way of example and not as a limitation on the scope of this invention.

I claim:

1. A microwave attenuator comprising a section of strip transmission line having at least a single ground plane and a strip conductor for propagating radio frequency energy therealong, input and output connectors for coupling radio frequency energy to said transmission line, said strip conductor having an arcuate interaction region between said connectors, a rotatable septum having an arcuate portion adapted to register with said arcuate interaction region in the position of maximum attenuation comprising a bifurcated attenuation septum and at least a single frequency insensitive conductive compensating septum disposed in coacting relationship with said attenuating material, and means coupled to said ground plane to rotate said attenuation septum and said conductive septum into and out of said arcuate interaction region to provide variable attenuation over a wide range of frequencies.

2. A microwave attenuator according to claim 1 wherein said means to rotate includes means for independently positioning said attenuating septum and said conductive compensating septum.

3. A microwave attenuator for use in TEM mode transmission lines comprising at least a single ground plane, a unitary strip conductor spaced from and parallel to said ground plane, attenuating means disposed between said ground plane and said strip conductor including a bifurcated septum of attenuating material, said bifurcation being disposed adjacent to and lengthwise of said transmission line, frequency insensitive conductive compensating means co-acting with said attenuating means to provide an attenuation versus frequency characteristic which is flat over a wide frequency range and means for positioning said attenuating and compensating means to provide variable values of attenuation.

4. A microwave attenuator for use in TEM mode transmission lines comprising at least a single ground plane, a unitary strip conductor spaced from and parallel to said ground plane, attenuating means disposed between said ground plane and said strip conductor including a bifurcated septum of attenuating material, said bifurcation being disposed adjacent to and lengthwise of said transmission line, frequency insensitive conductive compensating means including conductive portions within said bifurcated septum, successive conductive portions within a bifurcation being staggered with respect to the inner extremity thereof to provide a good impedance match co-acting with said attenuating means to provide an attenuation versus frequency characteristic which is flat over a wide frequency range and means for positioning said attenuating and compensating means to provide variable values of attenuation.

5. A microwave attenuator for use in transmission lines which propagate radio frequency energy in a transverse electric and magnetic field mode comprising, at least a single ground plane, a unitary strip conductor spaced from and parallel to said ground plane, an attenuating member adapted for interaction with said radio frequency energy and for insertion into said electric field and at least a single conductive means adapted for immersion at the position of maximum attenuation in the same said electric field between said strip conductor and said ground plane, and substantially perpendicular to the direction of said electric field to warp and terminate at least a portion of said electric field whereby a substantially constant value of attenuation is obtained over a wide range of frequencies.

6. A microwave attenuator according to claim 5 further including means for changing the amount of insertion of said attenuating member and said conductive means into said electric field to provide for variable values of attenuation.

References Cited by the Examiner

UNITED STATES PATENTS

| | | | |
|---|---|---|---|
| 2,725,535 | 11/55 | Grieg et al. | 333—84 |
| 2,890,424 | 6/59 | Arditi | 333—81 |
| 2,909,736 | 10/59 | Sommers | 333—81 |
| 2,913,686 | 11/59 | Fubini | 333—81 |
| 2,924,793 | 2/60 | Englemann | 333—81 |
| 2,961,621 | 11/60 | Tannenbaum et al. | 333—81 |
| 2,979,678 | 4/61 | Dwork | 333—81 |
| 3,002,165 | 9/61 | Ayer | 333—84 |
| 3,046,505 | 7/62 | Wilson et al. | 333—81 |

HERMAN KARL SAALBACH, *Primary Examiner.*